United States Patent [19]

Tanaka et al.

[11] Patent Number: 5,012,103

[45] Date of Patent: Apr. 30, 1991

[54] RADIATION DETECTOR

[75] Inventors: Eiichi Tanaka; Hiroshi Uchida, both of Shizuoka, Japan

[73] Assignee: Hamamatsu Photonics Kabushiki Kaisha, Shizuoka, Japan

[21] Appl. No.: 418,184

[22] Filed: Oct. 6, 1989

[30] Foreign Application Priority Data

Oct. 28, 1988 [JP] Japan .................. 63-272373

[51] Int. Cl.$^5$ .............................................. G01T 1/20
[52] U.S. Cl. .................. 250/368; 250/361 R
[58] Field of Search ............... 250/367, 368, 486.1, 250/361 R

[56] References Cited

U.S. PATENT DOCUMENTS

| | | | |
|---|---|---|---|
| 2,559,219 | 3/1949 | Ludeman | 250/483.1 |
| 3,769,059 | 10/1973 | Driard et al. | 250/367 |
| 4,292,538 | 9/1981 | Carlson | 250/367 |
| 4,639,600 | 1/1987 | Laurer | 250/367 |
| 4,700,074 | 10/1987 | Bosnjakovic | 250/368 |

FOREIGN PATENT DOCUMENTS 0003082  1/1986  Japan .................. 250/368

OTHER PUBLICATIONS

Instrumentation & Measurements, "Conical Plastic Scintillators Show Total Gamma Absorption", Hine et al., pp. 92-96, 9-60 (*Nucleonics*).
Uchida, H. et al., "Design of a Mosaic BGO Detector System for Positron CT", IEEE Transactions on Nuclear Science, vol. 33, No. 1, pp. 464-467, Feb. 1986.
Casey, M. E. et al., "A Multicrystal Two Dimensional BGO Detector System for Positron Emission Tomography", IEEE Transactions on Nuclear Science, vol. 33, No. 1, pp. 460-463, Feb. 1986.
Dougan, P. et al., "On the Preparation of Plexiglass Light-Guides for Scintillation Counter Hodoscope Elements", Nuclear Instruments and Methods, 78 (1970), pp. 317-318.

*Primary Examiner*—Carolyn E. Fields
*Assistant Examiner*—Drew A. Dunn
*Attorney, Agent, or Firm*—Finnegan, Henderson, Farabow, Garrett, and Dunner

[57] ABSTRACT

A radiation detector basically comprises a scintillator, a light guide for introducing scintillation light, and a photodetector for detecting the scintillation light. A light output portion of the scintillator is wedge-shaped, and a light input portion of the light guide is V-shaped in section so as to receive the wedge-shaped light output portion of the scintillator. With this arrangement, light reflection at the interfaces of the scintillator and light guide is reduced, resulting in an improvement of transmission efficiency of light.

4 Claims, 4 Drawing Sheets

RADIATION DETECTOR

BACKGROUND OF THE INVENTION

This invention relates to radiation detectors, and more particularly to a scintillation detector which uses a photodetector to detect scintillation light produced in a scintillator in response to a radiation applied thereto and introduced by a light guide.

When a radiation is applied to a non-organic crystal such as NaI(Tl) formed by adding a small quantity of Tl to NaI or CsI(Eu) formed by adding a small quantity of Eu to CsI or to an organic crystal such as anthracene or stilbene, scintillation light having a certain wavelength is produced as a part of the relaxation phenomenon which occurs after the crystal excitation. Therefore, a radiation detector can be formed in which the scintillation light thus produced is applied to a photodetector such as a photomultiplier tube where it is converted into an electrical signal.

A scintillation detector operating on the above-described measurement principle has a time resolution of the order of $10^{-6}$ sec in the case of the non-organic crystal, and $10^{-9}$ sec in the case of the organic crystal, thus nearly reaching the resolution limit of the photodetector. Hence, such a scintillation detector can be used in an apparatus high in counting rate, and has a wide range of application to provide signals in a coincident counting method or in a time of flight method.

The above-described scintillation detector has a light guide to lead an output light beam of a light emitting material, which is a scintillator, to the photodetector while changing the direction of the light beam, or performing the expansion, reduction or division of the light beam. The light guide is generally made of glass or acrylic resin because they can be readily machined or are excellent in optical transmittance. The coupling surface of the scintillator and the light guide is generally a planar surface.

FIG. 1 is a diagram showing the coupling of a scintillator 10 and a light guide 12 in a prior art scintillation detector. The scintillator is relatively large in area, and small in thickness. One end of the scintillator is coupled through the light guide 12 to one end of a photodetector 14 which comprises, for instance, a photomultiplier tube.

The most important characteristic of the light guide 12 described above is its transmission efficiency. The transmission efficiency is affected by the optical transmittance of the light guide (i.e., the transparency for the light beam emitted from the scintillator 10), the reflection of light at the interfaces (which are the coupling surfaces of the scintillator 10, the light guide 12, and the photodetector 14), and the surface treatment of the light guide 12.

Of these factors, the reflection of light at the interfaces depends greatly on the refractive indices of the scintillator 10, the light guide 12 and a coupling agent (which is an adhesive used to couple the scintillator 10 to the light guide 12, and the light guide 12 to the photodetector 14). In the case of a scintillator high in refractive index such as that of $Bi_4Ge_3O_{12}$ (BGO) having a refractive index of 2.15 which has been recently provided for measurement of gamma rays, since the refractive indices of the light guide and the coupling agent are generally 1.5 or less, the scintillator and the light guide or coupling agent are greatly different in refractive index. Hence, among light beams produced in the scintillator 10, the light reflected by the interface between the scintillator 10 and the coupling agent is increased in proportion while the light transmitted to the light guide 12 is decreased. Accordingly, the light transmitted to the light guide from the scintillator 10 is lowered in intensity, as a result of which the quantity of light reaching the photodetector 14 is decreased; that is, the radiation detector is lowered, for instance, in the sensitivity of detection.

SUMMARY OF THE INVENTION

An object of this invention is to eliminate the above-described difficulty accompanying a conventional radiation detector. More specifically, an object of the invention is to provide a radiation detector in which the output light of the scintillator is led to the photodetector with high efficiency.

The foregoing object of the invention has been achieved by the provision of a radiation detector in which scintillation light produced in a scintillator in response to a radiation applied thereto, is led through a light guide to a photodetector; and, according to the invention, the scintillator has a light output portion which is wedge-shaped, and the light guide has a light input portion which is so shaped as to include a V-shaped part to receive the wedge-shaped light output portion of the scintillator.

In the radiation detector, the V-shaped light input portion of the light guide may be formed by combining two light guide members which have sloped light input surfaces, respectively.

Furthermore in the radiation detector, the light input portion of the light guide may be modified into a shape of inverted-W with sloped surfaces on both sides of the light input portion.

Moreover, in a radiation detector in which scintillation light produced in a scintillator in response to a radiation applied thereto, is led to a photodetector; and, according to the invention, the scintillator has a light output portion which is in the form of saw teeth, and the light input portion of a light guide or photodetector is flat, the flat light input portion being coupled through an optical coupling agent to the saw-tooth-shaped light output portion.

This invention has been developed on the facts that the most important characteristic of the light guide in the scintillation detector is an optical transmission efficiency, one of the factors affecting the optical transmission efficiency is the reflection of light at the interfaces of the scintillator and the light guide, and the reflection of light depends greatly on the refractive indices of the scintillator, the light guide, and the coupling agent.

By virtue of the above structures of the light output portion of the scintillator and the light input portion of the light guide, the reflection of light at the interfaces, which is one of the difficulties accompanying the conventional radiation detection, is positively reduced. As a result, the light produced in the scintillator is effectively outputted and led to the light guide, thus preventing the reduction in optical transmission efficiency of the light guide.

DETAILED DESCRIPTION OF THE PREFERRED EMBODIMENTS

Preferred embodiments of this invention will be described with reference to the accompanying drawings. Wherever possible, the same reference numbers will be used throughout the drawings to refer to the same or like parts.

Figure 1:
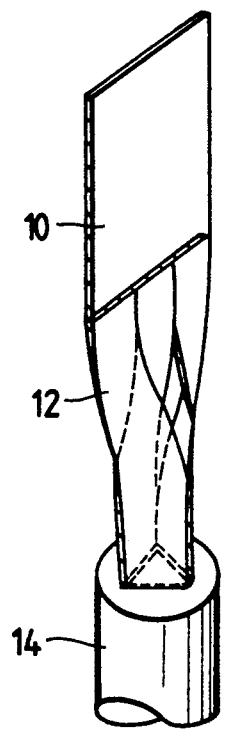
FIG. 1 is a perspective view showing the arrangement of one example of a prior art radiation detector.
Figure 2:
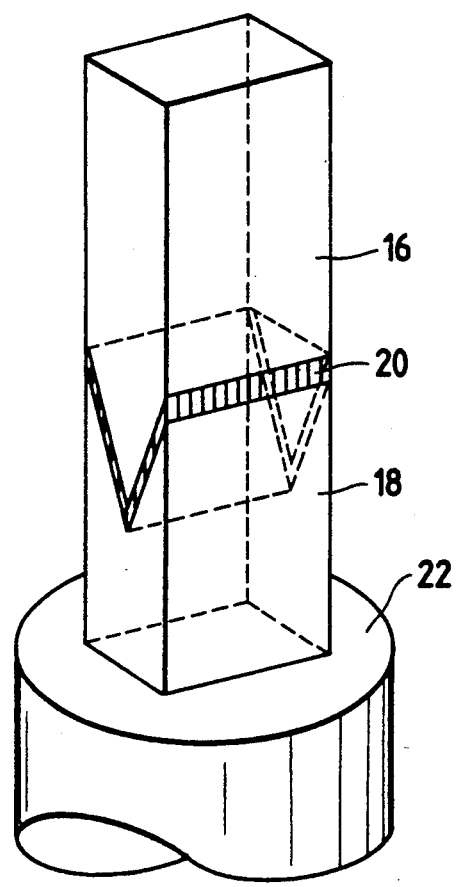
FIG. 2 is a perspective view showing the arrangement of essential components of a radiation detector which is a first embodiment of this invention.

FIG. 2 is a perspective view showing the arrangement of essential components of a radiation detector, which is a first embodiment of the invention.

As shown in FIG. 2, a scintillator 16 has a light output portion which is protruded outwardly in such a manner that it is V-shaped in section like a wedge, and accordingly the light input portion of a light guide 18 is dented in such a manner that it is V-shaped in section so as to receive the light output portion of the scintillator 16. A light output surface of the scintillator 16 is closely coupled with a light input surface of the light guide 18 through an optical coupling agent 20. A reflector such as $BaSO_4$ (not shown) is applied to the surfaces of the scintillator 16 except the light output surface and the surfaces of the light guide 18 except the light input surface and the coupling surface to the photodetector 22.

The operation of the first embodiment will be described.

The scintillator 16 produces scintillation light in response to a radiation applied thereto. The scintillation light thus produced is led through the light output surface of the scintillator 16, the optical coupling agent 20, the light input surface of the light guide 18, and the light output surface of the latter 18 to the photodetector 22, where it is converted into an electrical signal. In this operation, the reflection of light at the interfaces, which is one of the difficulties accompanying the conventional radiation detector, is effectively reduced, because, as was described above, the light output portion of the scintillator is protruded outwardly in such a manner that it is V-shaped in section like a wedge while the light input portion of the light guide 18 is dented in such a manner that it is also V-shaped in section so as to receive the light output portion of the scintillator 16. Hence, the optical coupling agent and the light guide are maintained high in optical transmission efficiency, and accordingly the light produced in the scintillator is led to the light guide with high efficiency.

Figure 3A:
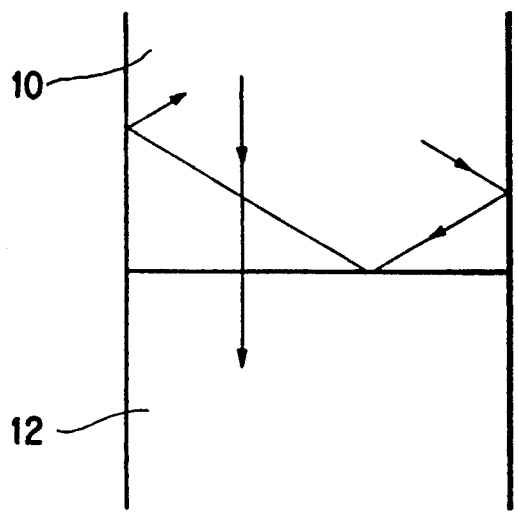
FIGS. 3(a) and 3(b) are sectional views for explaining the reduction in the light reflection in the first embodiment.
Figure 3B:
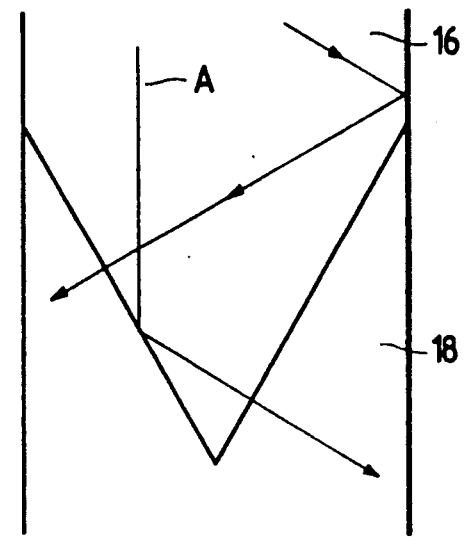

Referring to FIGS. 3(a) and 3(b), the mechanism of the above reduction in the light reflection is explained. As already explained in the foregoing, the large difference between refractive indices of the scintillator (e.g., 2.15 for BGO) and the light guide (e.g., ≈1.5 for acrylic resin) or optical coupling agent causes a large proportion of reflection at the interface there between, if the interface is flat as shown in FIG. 3(a). Whether the interface reflects or transmits the light from the scintillator depends on the incident angle of light to the interface. In the case of a BGO/acrylic resin interface, the critical incident angle is about 44 degrees. That is, the light with an incident angle larger than 44° is reflected by the interface. The reflected light is subjected to multi-reflection within the scintillator and may be attenuated through absorptions. The inventors have found that the interface structure of FIG. 2 or FIG. 3(b) changes the incident angle of light and can effectively increase in total the proportion of transmission light. For example, though scintillation light A in FIG. 3(b) is first reflected by one of the two output surfaces, it is then transmitted by the other output surface because of a small incident angle thereto. According to a computer simulation made by the inventors, 50% increase of the output light was obtained.

Figure 4:
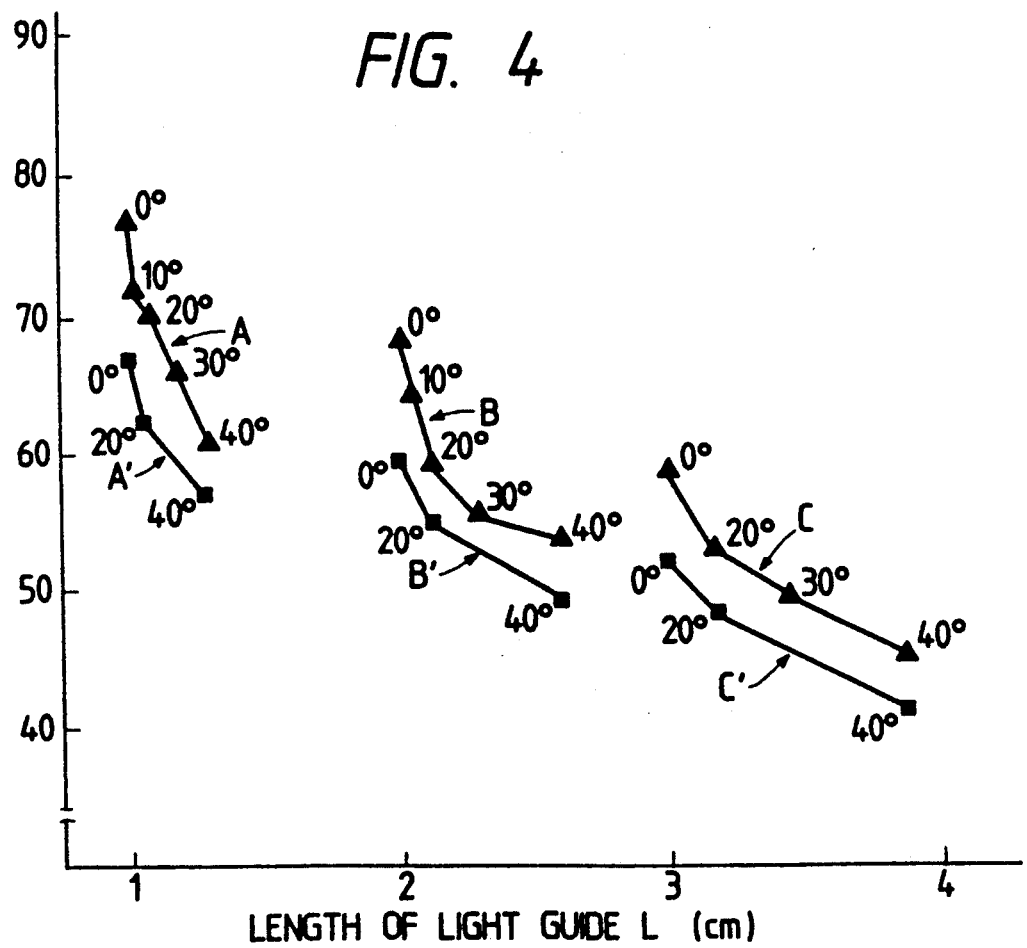
FIG. 4 is a graphical representation for comparing relative transmittances of light guides used in the first embodiment and a conventional radiation detector.
Figure 5:
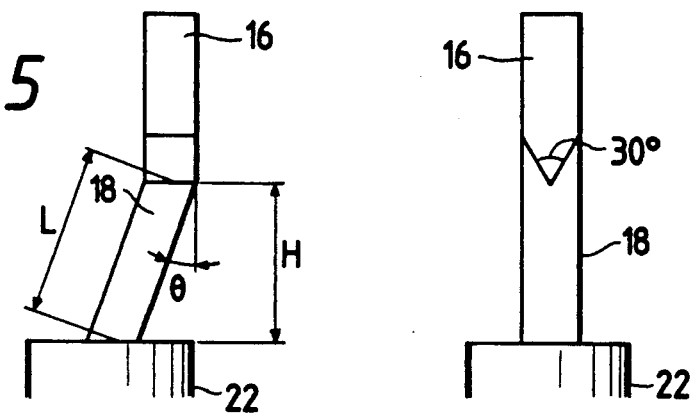
FIG. 5 is a diagram showing a front view and a side view for explaining the structures of radiation detectors used in the experiments whose results are as indicated in FIG. 4.

FIG. 4 is a graphical representation indicating the results of experiments in which the scintillation detector of the invention and the conventional scintillation detector have been compared with each other in relative transmittance. In the experiments, a variety of scintillation detectors were provided according to the first embodiment of the invention as follows: A BGO scintillator (3×8×20 mm) whose light output portion forms an angle of 30° as shown in FIG. 5 was used as the scintillator 16, while an acrylic light guide having a V-shaped light input portion was used as the light guide 18; and, the angle $\theta$ of inclination of the light guide 18 was changed to 0°, 10°, 20°, 30° and 40°, and the height H of the light guide was changed to 1 cm, 2 cm and 3 cm. On the other hand, the conventional scintillation detector was such that a scintillator was coupled through a planar interface to a light guide. The relative transmittances were determined by regarding as "100" the quantity of output light which was obtained when the rectangular parallelepiped BGO scintillator was coupled directly to the photodetector.

In the experiments carried out under the above-described conditions, the relative transmittances of the scintillation detector according to the invention were as indicated by the lines A, B and C in FIG. 4, whereas the relative transmittances of the conventional scintillation detectors were as indicated by the lines A', B' and C'. As is apparent from FIG. 4, the scintillation detectors of the invention are higher in the quantity of transmitted light by about 10% than the conventional scintillation detectors. This is due to the fact that the light output portion of the scintillator 16 is V-shaped in section.

In the first embodiment of the invention, the light guide 18 is provided as one unit, and therefore it has especially high optical transmission efficiency inside it.

A second embodiment of the invention will be described in detail.

Figure 6:
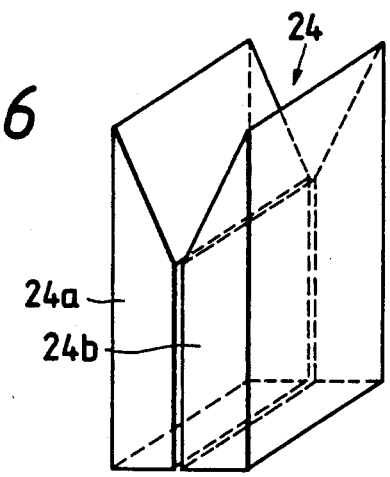
FIG. 6 is a perspective view showing the structure of a light guide in a second embodiment of the invention.

FIG. 6 is a perspective view showing the structure of a light guide 24 in the second embodiment of the invention. The light guide 24, as shown in FIG. 6, comprises: two light guide members 24a and 24b which are the left and right halves of the light guide 24 and have sloped surfaces, namely, light input surfaces, respectively. The light guide members 24a and 24b are combined together through a layer of air or coupling agent so that the sloped surfaces form a V-shaped light input surface similarly as in the case of the light guide 18 in the above-described first embodiment of the invention.

The formation of the light guide members 24a and 24b in the second embodiment is more easily achieved than that of the light guide 18 in the first embodiment; that is, the light guide 24 comprising the light guide members 24a and 24b can be manufactured more easily than the light guide 18 in the first embodiment.

Now, a third embodiment of the invention will be described in detail.

Figure 7:
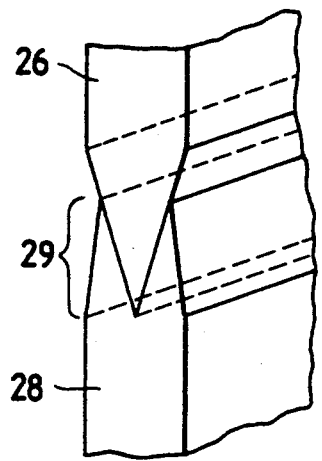
FIG. 7 is a perspective view showing the arrangement of essential components in a third embodiment of the invention.

FIG. 7 is a perspective view showing the arrangement of essential components of the third embodiment.

As shown in FIG. 7, the light output portion of a scintillator 26 is wedge-shaped similarly as in the case of the first embodiment, and the light input portion of a light guide 28 which is contacted with the wedge-shaped light output portion of the scintillator 26 is formed into a coupling portion 29 which is inverted-W-shaped. More specifically, the coupling portion 29 has sloped surfaces on both sides which are formed, for instance, by grinding, and a V-shaped light input portion between the sloped surfaces which is brought into close contact with the wedge-shaped light output portion of the scintillator 26.

In the third embodiment, too, similarly as in the first embodiment, the wedge-shaped light output portion of the scintillator 26 is engaged through the optical coupling agent with the V-shaped light input portion of the light guide 28. Furthermore, similarly as in the first embodiment, a reflector is applied to all the surfaces of the light guide 28 except the interface with the photodetector (not shown) and the V-shaped light input surface, and all the surfaces of the scintillator except the wedge-shaped light output surface.

Figure 8A:
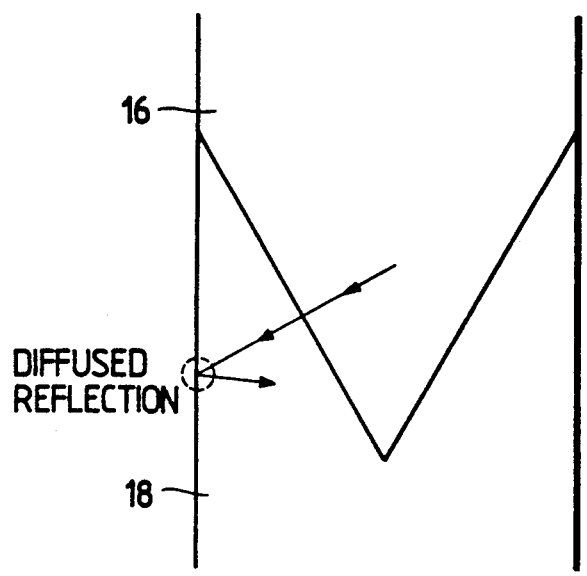
FIGS. 8(a) and 8(b) are sectional views for explaining the increase in the optical transmission efficiency of a light guide in accordance with the third embodiment.
Figure 8B:
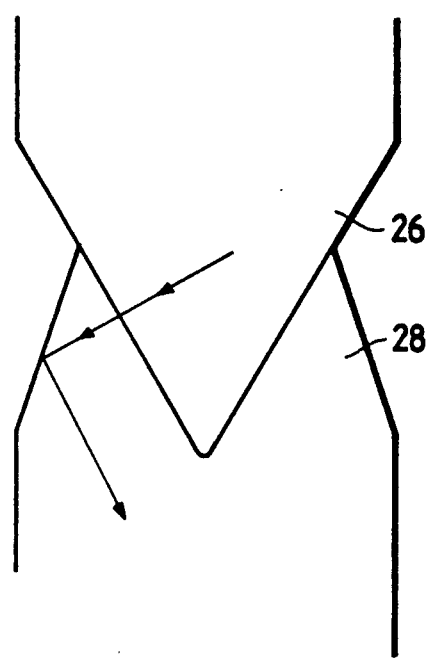

As was described above, in the third embodiment, the light input portion of the light guide 28 is formed into the coupling portion 29 which is inverted-W-shaped. Therefore, as shown in FIG. 8(b), the light emitted from the wedge-shaped light output surface, being reflected by the sloped outer surfaces of the inverted-W-shaped coupling portion 29, are led to the light output surface of the light guide 28 (i.e., the input surface of the photodetector) with high efficiency. Hence, the optical transmission efficiency of the light guide 18 adapted to lead the output light of the scintillator 26 to the photodetector is higher than in the first embodiment. On the other hand, in the case without the sloped outer surfaces as shown in FIG. 8(a), the output light from the scintillator 16 may be transmitted through the outer surface of the light guide 18 and then subjected to diffused reflection by the reflector. This diffused reflection prevents the light from being effectively directed toward the output surface of the light guide 18.

In the third embodiment, the light guide 28 is provided as one unit, and therefore the optical transmission efficiency therein is considerably high.

A fourth embodiment of the invention will be described in detail.

Figure 9:
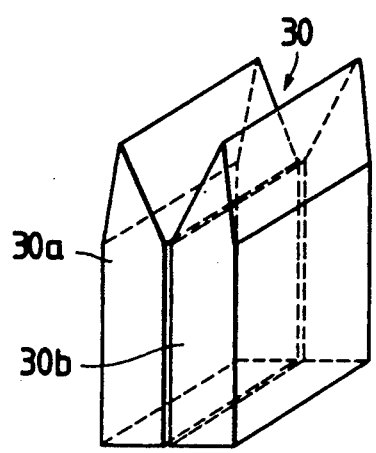
FIG. 9 is a perspective view showing the structure of a light guide in a fourth embodiment of the invention.

FIG. 9 is a perspective view showing the structure of a light guide 30 in the fourth embodiment.

The light guide 30 comprises: right and left light guide members 30b and 30a which have sloped outer surfaces, respectively. The light guide members 30a and 30b are combined together through a layer of air or optical coupling agent in such a manner that they form a coupling portion which has an inverted-W-shaped end face similarly as in the case of the light guide in the third embodiment.

In the fourth embodiment, the formation of the light guide members 30a and 30b can be more easily achieved than that of the light guide 28 in the third embodiment; and accordingly the light guide 30 comprising the light guide members 30a and 30b can be manufactured more easily than the light guide 18 in the third embodiment.

Figure 10:
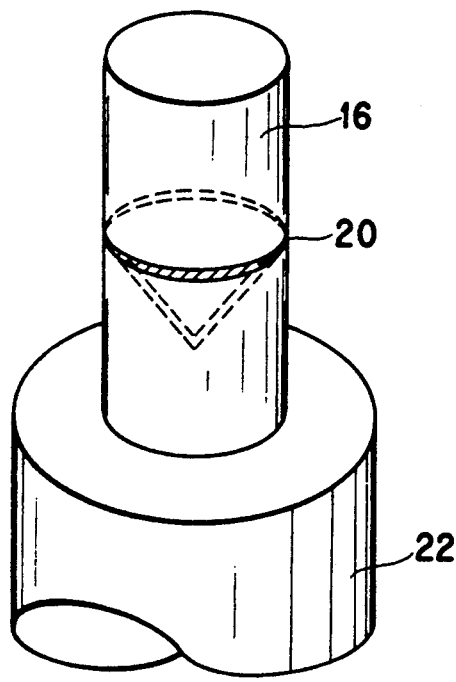
FIG. 10 is a perspective view showing the arrangement of essential components in a modification of the invention.

It should be pointed out that the shape of the light output portion of the scintillator is not limited to the wedge shape. The light output portion may be protruded to assume the shape of a cone (FIG. 10) or a pyramid, and the light input portion of the light guide may be dented so as to conform to the light output portion thus shaped.

A fifth embodiment of the invention will be described in detail.

Figure 11:
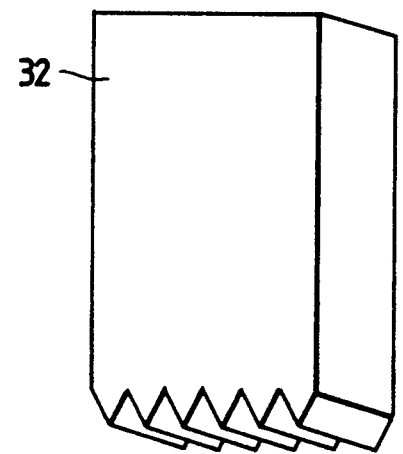
FIG. 11 is a perspective view showing the structure of a scintillator in a fifth embodiment of the invention.

FIG. 11 is a perspective view showing the structure of a scintillator 32 in the fifth embodiment.

The scintillator 32 has a light output portion which is in the form of saw teeth. The light output surface is coupled through an optical coupling agent to the planar light input surface of a light guide (not shown) or a photodetector (not shown).

In the fifth embodiment, the saw-tooth-shaped light output portion of the scintillator 32 is considered to be such a structure that a plurality of reduced light output portions of the first embodiment are aligned. Hence, the fifth embodiment has the same effects as the first embodiment.

In the fifth embodiment, the light input surface of the light guide may be flat. Therefore, the light guide can be formed very easily. In addition, the light guide may be eliminated; that is, the scintillator 32 may be coupled directly to the photodetector.

As is apparent from the above description, in the radiation detector of the invention, the coupling end faces of the scintillator and the light guide are so shaped as to effectively reduce the reflection of light at those faces, which is one of the difficulties accompanying the conventional radiation detector. Therefore, the optical coupling agent and the light guide are maintained high in optical transmission efficiency, and accordingly the light produced in the scintillator is led to the photodetector with high efficiency. Hence, the radiation detector of the invention can detect even weak radiations. This effect should be highly appreciated.

What is claimed is:

1. A radiation detector including:
   a scintillator for producing scintillation light in response to radiation applied thereto, said scintillator having a light output portion being in the shape of a single saw tooth;
   a light guide for introducing scintillation light outputted from said scintillator, said light guide having a light input portion being dented so as to conform to said light output portion of said scintillator; and a photodetector for detecting scintillation light outputted from said light guide.

2. A radiation detector as claimed in claim 1, further comprising an optical coupling agent provided between said scintillator and said light guide.

3. A radiation detector as claimed in claim 1, wherein said light guide comprises a pair of light guide members having respective sloped light input portions, and said V-shaped input portion is formed by said sloped light input portions when said pair of light guide members are combined together.

4. A radiation detector as claimed in claim 1, wherein said light input portion of said light guide has two outer surfaces which are sloped so that said light input portion assumes an inverted-W shape in section.

* * * * *

UNITED STATES PATENT AND TRADEMARK OFFICE
CERTIFICATE OF CORRECTION

PATENT NO. : 5,012,103
DATED : April 30, 1991
INVENTOR(S) : EIICHI TANAKA ET AL.

It is certified that error appears in the above-identified patent and that said Letters Patent is hereby corrected as shown below:

Claim 3, Column 7, Line 8, delete "and";

Claim 3, Column 7, Line 8, after "said" insert -- dented light input portion of said light guide comprising a --; and Claim 3, Column 8, Line 1, delete "is".

Signed and Sealed this

Twenty-third Day of February, 1993

Attest:

STEPHEN G. KUNIN

Attesting Officer

Acting Commissioner of Patents and Trademarks